(12) United States Patent
Kaehler

(10) Patent No.: US 10,146,997 B2
(45) Date of Patent: Dec. 4, 2018

(54) EYELID SHAPE ESTIMATION USING EYE POSE MEASUREMENT

(71) Applicant: Magic Leap, Inc., Dania Beach, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/238,516

(22) Filed: Aug. 16, 2016

(65) Prior Publication Data

US 2017/0053165 A1 Feb. 23, 2017

Related U.S. Application Data

(60) Provisional application No. 62/208,519, filed on Aug. 21, 2015.

(51) Int. Cl.
*G06K 9/00* (2006.01)
*G02B 27/01* (2006.01)

(52) U.S. Cl.
CPC ......... *G06K 9/0061* (2013.01); *G02B 27/017* (2013.01); *G02B 2027/014* (2013.01); *G02B 2027/0138* (2013.01)

(58) Field of Classification Search
CPC combination set(s) only.
See application file for complete search history.

(56) References Cited

U.S. PATENT DOCUMENTS

| 5,291,560 | A | | 3/1994 | Daugman |
| 5,583,795 | A | * | 12/1996 | Smyth .................. A61B 3/0025 359/630 |
| 5,719,951 | A | | 2/1998 | Shackleton et al. |
| 5,774,591 | A | * | 6/1998 | Black ................. G06K 9/00248 382/118 |
| 6,095,989 | A | | 8/2000 | Hay et al. |
| 6,154,559 | A | | 11/2000 | Beardsley |

(Continued)

FOREIGN PATENT DOCUMENTS

| FR | 2915301 | | 10/2008 |
| JP | 2006120006 | A * | 5/2006 |

(Continued)

OTHER PUBLICATIONS

Daugman, J., "Epigenetic randomness, complexity and singularity of human iris patterns", Proc Biol Sci., 268(1477), Aug. 22, 2001, 1737-1740.

(Continued)

*Primary Examiner* — Tsung-Yin Tsai
(74) *Attorney, Agent, or Firm* — Knobbe, Martens, Olson & Bear LLP

(57) ABSTRACT

Systems and methods for eyelid shape estimation are disclosed. In one aspect, after receiving an eye image of an eye (e.g., from an image capture device), an eye pose of the eye in the eye image is determined. From the eye pose, an eyelid shape (of an upper eyelid or a lower eyelid) can be estimated using an eyelid shape mapping model. The eyelid shape mapping model relates the eye pose and the eyelid shape. In another aspect, the eyelid shape mapping model is learned (e.g., using a neural network).

13 Claims, 6 Drawing Sheets

(56) References Cited

U.S. PATENT DOCUMENTS

| | | | |
|---|---|---|---|
| 6,463,176 B1* | 10/2002 | Matsugu | G06K 9/00268 382/195 |
| 7,480,396 B2 | 1/2009 | Teiwes et al. | |
| 7,682,026 B2 | 3/2010 | Huffman et al. | |
| 8,077,914 B1 | 12/2011 | Kaplan | |
| 8,403,479 B2 | 3/2013 | Potze et al. | |
| 8,693,745 B2* | 4/2014 | Izatt | G01B 11/2441 382/128 |
| 8,854,491 B2 | 10/2014 | Ford et al. | |
| 8,950,867 B2 | 2/2015 | Macnamara | |
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,671,566 B2 | 6/2017 | Abovitz et al. | |
| 9,791,700 B2 | 10/2017 | Schowengerdt et al. | |
| 2003/0169907 A1 | 9/2003 | Edwards et al. | |
| 2005/0069207 A1* | 3/2005 | Zakrzewski | B64D 45/0015 382/190 |
| 2006/0147094 A1 | 7/2006 | Yoo | |
| 2006/0165266 A1* | 7/2006 | Hamza | G06K 9/00597 382/117 |
| 2006/0188144 A1 | 8/2006 | Sasaki et al. | |
| 2006/0203088 A1 | 9/2006 | Hammoud et al. | |
| 2006/0239670 A1 | 10/2006 | Cleveland | |
| 2006/0280340 A1 | 12/2006 | Derakhshani et al. | |
| 2007/0140531 A1 | 6/2007 | Hamza | |
| 2007/0274570 A1 | 11/2007 | Hamza | |
| 2008/0002262 A1 | 1/2008 | Chirieleison | |
| 2008/0069411 A1 | 3/2008 | Friedman et al. | |
| 2008/0151186 A1 | 6/2008 | Adachi et al. | |
| 2008/0226138 A1 | 9/2008 | Suzuki et al. | |
| 2008/0232650 A1 | 9/2008 | Suzuki et al. | |
| 2008/0253622 A1 | 10/2008 | Tosa et al. | |
| 2009/0135537 A1 | 5/2009 | Yasuoka et al. | |
| 2009/0175537 A1 | 7/2009 | Tribelhorn et al. | |
| 2009/0244274 A1 | 10/2009 | Morita et al. | |
| 2009/0252382 A1 | 10/2009 | Liu et al. | |
| 2009/0310829 A1* | 12/2009 | Baba | G06K 9/00248 382/118 |
| 2010/0054548 A1 | 3/2010 | Inada | |
| 2010/0202669 A1 | 8/2010 | Hollingsworth et al. | |
| 2011/0150334 A1 | 6/2011 | Du et al. | |
| 2011/0153287 A1* | 6/2011 | Potze | G02C 7/028 703/2 |
| 2011/0280454 A1 | 11/2011 | Su et al. | |
| 2012/0127062 A1 | 5/2012 | Bar-Zeev et al. | |
| 2012/0163678 A1 | 6/2012 | Du et al. | |
| 2012/0219189 A1 | 8/2012 | Wu et al. | |
| 2013/0082922 A1 | 4/2013 | Miller | |
| 2013/0125027 A1 | 5/2013 | Abovitz | |
| 2013/0169530 A1 | 7/2013 | Bhaskar et al. | |
| 2013/0169683 A1 | 7/2013 | Perez et al. | |
| 2014/0023240 A1 | 1/2014 | Venkatesha et al. | |
| 2014/0071539 A1 | 3/2014 | Gao | |
| 2014/0072230 A1 | 3/2014 | Ruan et al. | |
| 2014/0133705 A1 | 5/2014 | Hanita et al. | |
| 2014/0147022 A1 | 5/2014 | Zhou et al. | |
| 2014/0161317 A1 | 6/2014 | Hiramaki et al. | |
| 2014/0177023 A1 | 6/2014 | Gao et al. | |
| 2014/0177906 A1 | 6/2014 | Horowitz | |
| 2014/0218468 A1 | 8/2014 | Gao et al. | |
| 2014/0267771 A1 | 9/2014 | Lawler | |
| 2014/0285404 A1 | 9/2014 | Takano et al. | |
| 2014/0300867 A1 | 10/2014 | Fassi et al. | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0063303 A1 | 3/2016 | Cheung et al. | |
| 2016/0085299 A1 | 3/2016 | Horesh | |
| 2016/0302971 A1* | 10/2016 | Morley | A61F 9/00825 |
| 2017/0053165 A1 | 2/2017 | Kaehler | |
| 2017/0053166 A1 | 2/2017 | Amayeh et al. | |
| 2017/0109580 A1 | 4/2017 | Kaehler et al. | |

FOREIGN PATENT DOCUMENTS

| | | |
|---|---|---|
| WO | WO 2017/034860 | 3/2017 |
| WO | WO 2017/034861 | 3/2017 |
| WO | WO 2017/066296 | 4/2017 |

OTHER PUBLICATIONS

Daugman, J., "How Iris Recognition Works", IEEE Transactions on Circuits and Systems for Video Technology, vol. 14, No. 1, Jan. 30, 2004, in 10 pages.

Daugman, J., "New Methods in Iris Recognition", IEEE Transactions on Systems, Man, and Cybernetics—Part B: Cybernetics, vol. 37, No. 5, Oct. 2007, 1167-1175.

Alonso-Fernandez, F. et al., "Iris Recognition Based on SIFT Features", 2009 International Conference on Biometrics, Identity and Security (BIdS), Sep. 22-23, 2009, in 28 pages.

Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.

Derpanis, K., "Overview of the Ransac Algorithm", May 13, 2010, in 2 pages, http://www.cse.yorku.ca/~kosta/CompVis_Notes/ransac.pdf.

Rublee, E. et al., "ORB: an efficient alternative to SIFT or SURF", Proceedings of the 2011 International Conference on Computer Vision, Nov. 6-13, 2011, in 8 pages.

International Search Report and Written Opinion for PCT Application No. PCT/US16/47177, dated Jan. 19, 2017.

Invitation to Pay Additional Fees for PCT Application No. PCT/US16/47177, dated Oct. 12, 2016.

Annapoorani G. et al., "Accurate and Fast Iris Segmentation", Inter J Engin Science Tech. (Jul. 2010) 2(6): 1492-1499.

Li, D. et al., "Starburst: A hybrid algorithm for video-based eye tracking combining feature-based and model-based approaches", IEEE CVPR Workshop on V4HCI, Jun. 2005, in 8 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

International Preliminary Report on Patentability, re PCT Application No. PCT/US2016/047177, dated Mar. 8, 2018.

\* cited by examiner

EYELID SHAPE ESTIMATION USING EYE POSE MEASUREMENT

CROSS-REFERENCE TO RELATED APPLICATIONS

This application claims the benefit of priority under 35 U.S.C. § 119(e) to U.S. Provisional Application No. 62/208,519, filed on Aug. 21, 2015, entitled "EYELID SHAPE ESTIMATION USING EYE POSE MEASUREMENT," which is hereby incorporated by reference in its entirety.

BACKGROUND

Field

The present disclosure relates generally to systems and methods for processing eye imagery and more particularly for estimating eyelid shapes using eye pose measurements.

Description of the Related Art

The human iris can be used as a source of biometric information. Biometric information can provide authentication or identification of an individual. The process of extracting biometric information, broadly called a biometric template, typically has many challenges.

SUMMARY

In one aspect, a method for eyelid shape estimation is disclosed. The method is performed under control of a hardware processor and comprises: detecting a pupillary boundary of an eye using an edge detector; determining an eye pose of the eye using the pupillary boundary, wherein an eye pose coordinate system of the eye pose comprises an azimuthal angle and a zenithal angle of the eye relative to a resting orientation of the eye, wherein a functional relationship between the eye pose coordinate system and an eyelid shape coordinate system comprises a mapping matrix, and wherein the eyelid shape coordinate system comprises a horizontal shift, a vertical shift, and a curvature of the eye; estimating an eyelid shape of the eye based at least in part on the eye pose and the functional relationship; and fitting a parabolic curve of an eyelid shape of the eye based on the eyelid shape. Alternatively, in another aspect, this analysis may be applied in the reverse order, beginning with a determination of the eyelid position and estimating an iris location, a pupil location, or an eye pose. In another aspect, the method for eyelid shape estimation can be performed by a head mounted display system.

In another aspect, a head mounted display system is disclosed. The head mounted display system comprises: an image capture device configured to capture an eye image; non-transitory memory configured to store an eyelid shape mapping model; and a hardware processor in communication with the non-transitory memory, the hardware processor programmed to: receive the eye image from the image capture device; determine an eye pose of an eye in the eye image; and estimate an eyelid shape of the eye based at least in part on the eye pose and an eyelid shape mapping model, wherein the eyelid shape mapping model relates the eyelid shape and the eye pose.

In yet another aspect, a method for estimating an eyelid shape from an eye image is disclosed. The method is performed under control of a hardware processor and comprises: determining an eye pose of an eye in an eye image; and estimating an eyelid shape based on the eye pose.

In a further aspect, a method for training an eyelid shape mapping model for eyelid shape estimation is disclosed. The method is under control of a hardware processor and comprises: accessing training data that relates eyelid shapes to eye poses; training an eyelid shape mapping model on the training data; and outputting the trained eyelid shape mapping model.

In another aspect, a method for processing an eye image is disclosed. The method is performed under control of a hardware processor and comprises: detecting a boundary between an eyelid of an eye and an iris of the eye using an edge detector; determining an eyelid shape of the eye using the boundary between the eyelid of the eye and the iris of the eye, wherein an eyelid shape coordinate system of the eyelid shape comprises a horizontal shift, a vertical shift, and a curvature of the eye, wherein a functional relationship between the eyelid shape coordinate system and an eye pose coordinate system comprises a mapping matrix, and wherein the eye pose coordinate system comprises an azimuthal deflection angle and a zenithal deflection angle of the eye relative to a resting orientation of the eye; estimating an eye pose of the eye based at least in part on the eyelid shape and the functional relationship.

In yet another aspect, a head mounted display system is disclosed. The head mounted display system comprises: an image capture device configured to capture an eye image; non-transitory memory configured to store an eye pose mapping model; and a hardware processor in communication with the non-transitory memory, the hardware processor programmed to: receive the eye image from the image capture device; determine an eyelid shape of an eye in the eye image; and estimate an eye pose of the eye based at least in part on the eyelid shape and the eye pose mapping model, wherein the eyelid shape mapping model relates the eyelid shape to the eye pose.

In a further aspect, a method for estimating an eye pose from an eyelid shape is disclosed. The method is performed under control of a hardware processor and comprises: determining an eyelid shape of an eye in an eye image; and estimating an eye pose based at least partly on the eyelid shape.

In another aspect, a method for training an eye pose mapping model for estimating eye pose from an eyelid shape is disclosed. The method is under control of a hardware processor and comprises: accessing training data that relates eyelid shapes to eye poses; training an eye pose mapping model on the training data; and outputting the trained eye pose mapping model.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A schematically illustrates an example coordinate system for determining an eye pose of an eye.

Figure 1:
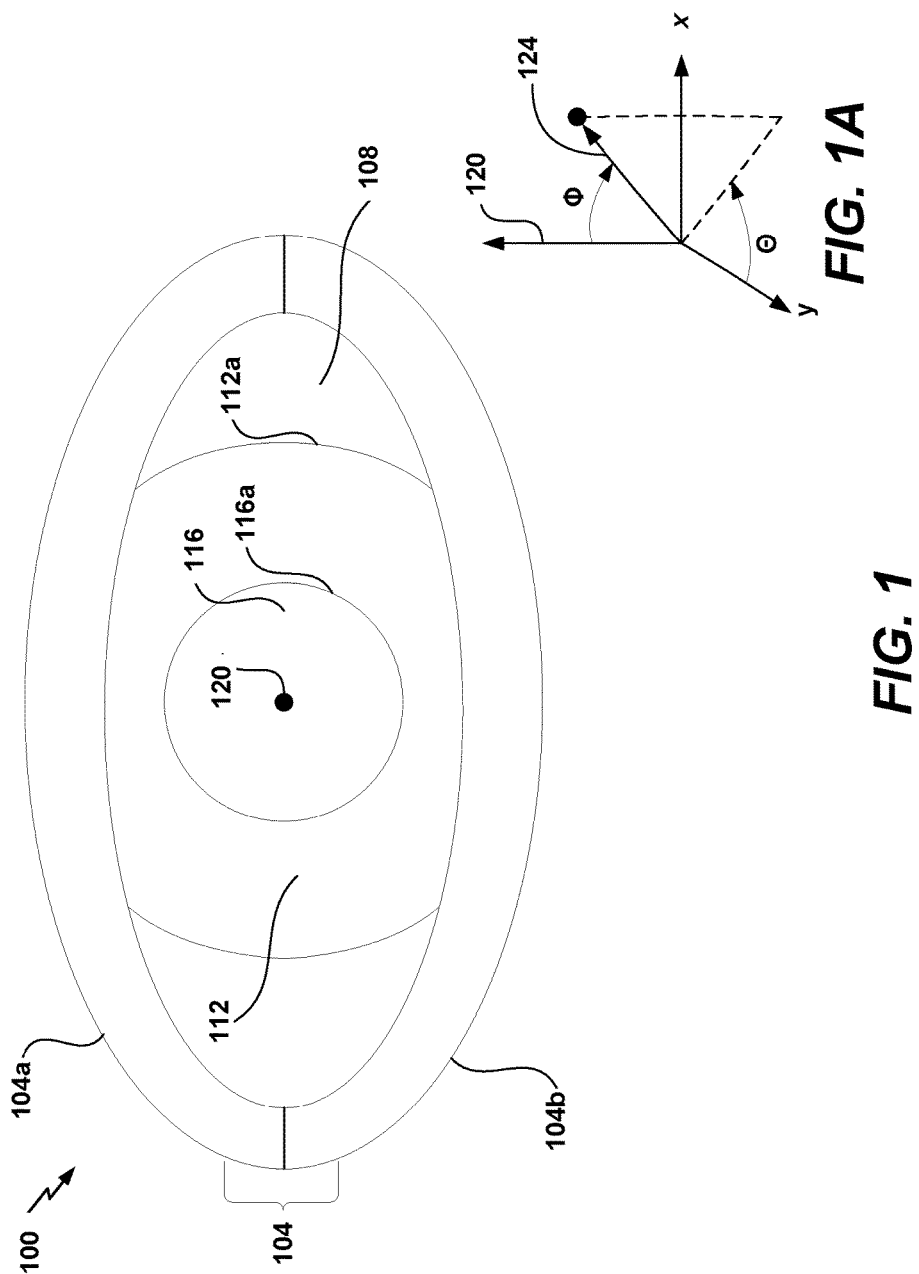
FIG. 1 schematically illustrates an example of an eye.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, including finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (the interior boundary of the iris) and the limbus (the exterior boundary of the iris) can be identified as separate segments of image data. In addition to this segmentation of the iris, the portion of the iris that is occluded by the eyelids (upper or lower) can be estimated. This estimation is performed because, during normal human activity, the entire iris of a person is rarely visible. In other words, the entire iris is not generally free from occlusions of the eyelids.

Estimating the portion of the iris occluded by eyelids has presented challenges. However, using the techniques described herein, the challenges present in iris estimation can be mitigated by first estimating the shape of the eyelid. This estimation of eyelid shape can be used as a starting point for iris segmentation. Similarly, an existing estimation of the pointing direction of the eye can be used as a starting point for eyelid position estimation and subsequent extraction of detailed information about the eye, often particularly the iris.

Eyelids may be used by the eye to keep the eye moist, for example, by spreading tears and other secretions across the eye surface. Eyelids may also be used to protect the eye from foreign debris. As an example, the blink reflex protects the eye from acute trauma. As another example, even when the eye is actively viewing the world, the eyelids may protect the eye, for example, by moving automatically in response to changes in the pointing direction of the eye. Such movement by the eyelids can maximize protection of the eye surface while avoiding occlusion of the pupil. However, this movement presents further challenges when extracting biometric information with iris-based biometric measurements such as iris segmentation. For example, to use iris segmentation, the areas of the iris that are occluded by the eyelids must be estimated and masked from identity verification computations.

With the techniques disclosed herein, using the pose of the pupil, eyelid shape estimation can be used to substantially predict the areas of occlusion by the eyelids over the iris. Embodiments of eyelid shape estimation described herein advantageously can be used for estimating the portion of the iris occluded by eyelids. Additionally, in some implementations, this eyelid shape estimation can be used to generate a model for the eyelid location that may be used either in place of, or as a starting point, for segmentation algorithms such as eyelid segmentation algorithms.

The present disclosure will describe examples of the estimation of an eyelid shape using an eye pose determination, as well as the alternative process, in which the eye pointing direction is estimated from the eyelid shape. Eye pose determinations can be determined from eye images. The eye pose is a determination of the direction that the eye is looking toward (often determined relative to a natural resting direction of the eye). In some implementations, using an eye pose determination, curves can be fitted to model the shape of an eyelid. The curves can be fitted with a mapping matrix that uses regression to map values from the parametric form of an eye pose determination to a parametric curve which represents the eyelid shape. For example, this parametric form may be a parabolic curve. Such a mapping matrix can associate a relationship of an eye pose coordinate system to an eyelid shape coordinate system. Accordingly, the location of the eyelids can be estimated from eye images, or vice versa. Further, as described herein, the eyelid shape estimation techniques disclosed can be used in eyelid detecting algorithms (e.g., an eyelid segmentation) based on an eye pose determination.

As used herein, video is used in its ordinary sense and includes, but is not limited to, a recording of a sequence of visual images. Each image in a video is sometimes referred to as an image frame or simply a frame. A video can include a plurality of sequential frames or non-sequential frames, either with or without an audio channel. A video can include a plurality of frames, which are ordered in time or which are not ordered in time. Accordingly, an image in a video can be referred to as an eye image frame or eye image.

Example of an Eye Image

FIG. 1 illustrates an image of an eye 100 with eyelids 104, sclera 108 (the "white" of the eye), iris 112, and pupil 116. Curve 116a shows the pupillary boundary between the pupil 116 and the iris 112, and curve 112a shows the limbic boundary between the iris 112 and the sclera 108. The eyelids 104 include an upper eyelid 104a and a lower eyelid 104b. The eye 100 is illustrated in a natural resting pose (e.g., in which the user's face and gaze are both oriented as they would be toward a distant object directly ahead of the user). The natural resting pose of the eye 100 can be indicated by a natural resting direction 120, which is a direction orthogonal to the surface of the eye 100 when in the natural resting pose (e.g., directly out of the plane for the eye 100 shown in FIG. 1) and in this example, centered within the pupil 116.

As the eye 100 moves to look toward different objects, the eye pose will change relative to the natural resting direction 120. The current eye pose can be determined with reference to an eye pose direction 122, which is a direction orthogonal to the surface of the eye (and centered in within the pupil 116) but oriented toward the object at which the eye is currently directed. With reference to an example coordinate system shown in FIG. 1A, the pose of the eye 100 can be expressed as two angular parameters indicating an azimuthal deflection and a zenithal deflection of the eye pose direction 124 of the eye, both relative to the natural resting direction 120 of the eye. For purposes of illustration, these angular parameters can be represented as θ (azimuthal deflection, determined from a fiducial azimuth) and φ (zenithal deflection, sometimes also referred to as a polar deflection). In some implementations, angular roll of the eye around the eye pose direction 124 can be included in the determination of eye pose, and angular roll can be included in the following analysis. In other implementations, other techniques for determining the eye pose can be used, for example, a pitch, yaw, and optionally roll system.

An eye image can be obtained from a video using any appropriate process, for example, using a video processing algorithm that can extract an image from one or more sequential frames. The pose of the eye can be determined from the eye image using a variety of eye-tracking techniques. For example, an eye pose can be determined by considering the lensing effects of the cornea on light sources that are provided. Any suitable eye tracking technique can be used for determining eye pose in the eyelid shape estimation techniques described herein.

Example Eyelid Shape Estimation Routine

Figure 2:
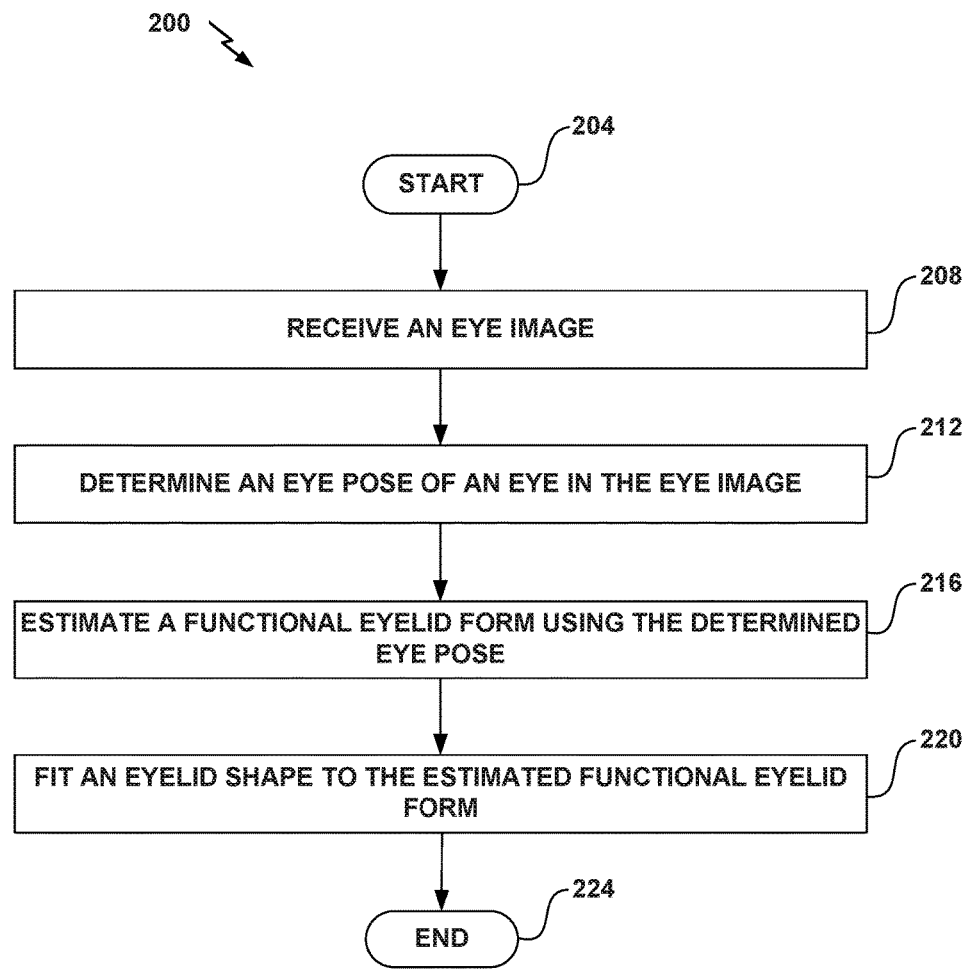
FIG. 2 is a flow diagram of an example eyelid shape estimation routine.

FIG. 2 is a flow diagram of an example eyelid shape estimation routine 200. The eyelid shape estimation routine 200 can be implemented by a processor such as a hardware processor. Eyelid shape estimation can also be referred to as eyelid shape detection. Routine 200 begins at block 204. At block 208, an eye image is received. The eye image can be received from a variety of sources including, for example, an image capture device, a head mounted display system, a server, a non-transitory computer-readable medium, or a client computing device (e.g., a smartphone). In some implementations, the eye image can be extracted from a video.

At block 212, the eye pose of the eye image is determined. For example, edge detection can be applied to the eye image to determine the eye pose. Edge detection can be applied by various edge detectors, edge detection algorithms, or filters. For example, a Canny Edge detector can be applied to the image to detect edges in lines of the image. Edges are points located along a line that correspond to the local maximum derivative. For example, the pupillary boundary 116a can be located using a Canny edge detector. With the location of the pupil determined, various image processing techniques can be used to detect the "pose" of the pupil 116. Determining an eye pose of an eye image can also be referred to as detecting an eye pose of the eye image. The pose can also be referred to as the gaze, pointing direction, or the orientation of the eye. For example, the pupil 116 may be looking leftwards towards an object, and the pose of the pupil 116 could be classified as a leftwards pose.

Other methods can be used to detect the location of the pupil. For example, a concentric ring can be located in an eye image using a Canny Edge detector. As another example, an integro-differential operator can be used to find the pupillary or limbus boundaries of the iris. For example, the Daugman integro-differential operator, the Hough transform, or other iris segmentation techniques can be used to return a curve that estimates the boundary of the pupil or the iris.

In some implementations, the eye image can optionally be pre-processed with a filter to remove high-frequency noise from the image. The filter can be a low-pass filter or a morphological filter such as an open filter. The filter can remove high-frequency noise from the pupillary boundary 116a, thereby removing noise that can hinder eye pose determination.

Although the foregoing examples have been described in the context locating a pupil in an eye image to determine pose, this is for illustration and is not intended to be limiting. In other implementations, any suitable image processing technique or detection technique can be used to determine the pose of an eye. As an example, the limbic boundary 112a and the location of the iris 112 can be used to respectively detect the location of the iris and determine a pose of the iris. The functional form for an iris 112 may, but need not, be different from the functional form for a pupil 116. Once determined, the pose of the eye can be represented in variety of functional forms, for example, with two angular deflections such as azimuth and zenith shown in FIG. 1A.

Continuing with reference to FIG. 2, at block 216, the functional form of an eyelid can be estimated using the eye pose determined at block 212. In various implementations, this functional form of the eyelid can be estimated using a mapping of the eye pose determination to the eyelid shape. The mapping can be performed for individuals, various populations of individuals (e.g., males, females, ethnicities, or any demographic group), non-human animals, etc.

Curves can be used to approximate an eyelid shape. In a non-limiting example implementation the eyelid can be represented by a polynomial form such as a parabola (quadratic form). Other implementations are also possible. In other implementations, any suitable mathematical formulation or curve can be used to represent the eyelid. That is, the representation of the eyelid curve need not be a polynomial form of any order. For example, a curve can be another non-linear mathematical expression. Different formulations or curves are possible for each eyelid. As discussed below, non-parametric representations of eyelid shape can be used (e.g., neural network classifiers). Although the subsequent example will be described in the context of three parameters fitting a parabolic curve, this is for illustration and is not intended to be limiting. In other implementations, any suitable number of parameters can be used to fit the chosen curve. In addition, any functional form other than a parabolic form can be used.

Eye pose determinations determined at block 212 can be represented in a coordinate system, for example, represented by coordinates, x and y, with the coordinate system centered at the center of the pupil when the pupil is in a natural resting orientation, with x representing the horizontal direction and y representing the orthogonal vertical direction. In an example of a parabolic curve fitting an eyelid shape, the parabolic curve can be parameterized by three parameters. Illustratively, these three parameters can be referred to as the horizontal shift u; the vertical shift v; and the curvature k of the eyelid.

Accordingly, in this embodiment, the equation for a parabola for the eyelid shape is:

$$y = \frac{1}{2}k(x-u)^2 + v. \qquad \text{Eq. (1)}$$

Eye pose determinations (e.g., $(\theta, \phi)$) can be used to determine corresponding eyelid shape parameters (e.g., (u, v, k)). From one perspective, this can be viewed as a mapping from the two-parameter space $(\theta, \phi)$ to the three-parameter space (u, v, k). In various implementations, this mapping can be used to segment the eyelids, or to generate an initial approximation of eyelid shape parameters, which may be used to improve the performance of other eyelid segmentation algorithms. As discussed below, other implementations are possible. A mapping can also be referred to as a mapping function. Although the subsequent example will be described in the context of fitting an eyelid shape using an eye pose mapping, this is for illustration and is not intended to be limiting. In other implementations, any mapping function (parametric or non-parametric) based on an eye pose determination can be used to fit an eyelid shape. In addition, varying functional forms to perform this mapping are possible. Generally speaking, the mapping function associates a relationship of an eye pose coordinate system to an eyelid shape coordinate system. Illustratively, an eye pose determination can be represented as P parameters and mapped to fit an eyelid functional form that is represented by Q parameters. For example, the eyelid functional form can be represented by Q parameters, where Q can be the width of pixels in a display (e.g., display 608 in FIG. 6 below). A mapping of a non-linear determination to a functional form is also possible, or vice versa.

At block 220, an eyelid shape can be fitted to a curve determined to be the eyelid shape based on an eye pose mapping. Continuing in the example of three-parameter space, a mapping can be decomposed into three separate mappings: $u(\theta, \phi)$, $v(\theta, \phi)$, and $k(\theta, \phi)$. For example, such decompositions can be modeled as polynomials of a specific order. One possible parameterization for these functions can be of the form, $\vec{U} = A\vec{\Theta}$, where the respective elements of $\vec{U} = A\vec{\Theta}$ have the following definition:

$$\begin{bmatrix} u \\ v \\ k \end{bmatrix} = \begin{bmatrix} a_{00} & a_{01} & a_{02} & a_{03} & a_{04} \\ a_{10} & a_{11} & a_{12} & a_{13} & a_{14} \\ a_{20} & a_{21} & a_{22} & a_{23} & a_{24} \end{bmatrix} \begin{bmatrix} \theta^2 \\ \theta \\ \phi^2 \\ \phi \\ 1 \end{bmatrix}. \quad \text{Eq. (2)}$$

In Eq. (2), $\vec{U}$ is the column vector [u, v, k] of eyelid shape parameters to be determined from eye pose determinations of ($\theta$, $\phi$). The mapping A in Eq. (2) relates the eyelid shape parameters to a polynomial (quadratic, in this example) function $\vec{\Theta}$ of the angular eye pose determinations. In the example of three-parameter space, the mappings $u(\theta, \phi)$, $v(\theta, \phi)$, and $k(\theta, \phi)$ have the following definitions:

$$u(\theta, \phi) = \begin{bmatrix} a_{00} & a_{01} & a_{02} & a_{03} & a_{04} \end{bmatrix} \begin{bmatrix} \theta^2 \\ \theta \\ \phi^2 \\ \phi \\ 1 \end{bmatrix}, \quad \text{Eq. (3)}$$

$$v(\theta, \phi) = \begin{bmatrix} a_{10} & a_{11} & a_{12} & a_{13} & a_{14} \end{bmatrix} \begin{bmatrix} \theta^2 \\ \theta \\ \phi^2 \\ \phi \\ 1 \end{bmatrix}, \quad \text{Eq. (4)}$$

and $$k(\theta, \phi) = \begin{bmatrix} a_{20} & a_{21} & a_{22} & a_{23} & a_{24} \end{bmatrix} \begin{bmatrix} \theta^2 \\ \theta \\ \phi^2 \\ \phi \\ 1 \end{bmatrix}. \quad \text{Eq. (5)}$$

In other embodiments, the function $\vec{\Theta}$ can be a polynomial of different degree than two (e.g., 1, 3, 4, 5, or more), a non-polynomial function, a rational function, or any other appropriate functional form. In yet other embodiments, the eye pose determinations can include roll of the eye about the eye pose direction, and the column vector $\vec{\Theta}$ can include functional forms (e.g., polynomial such as quadratic) in the roll angle. Further, although the relationship between $\vec{U}$ and $\vec{\Theta}$ is linear in Eq. (2), in other implementations, non-linear relationships can be utilized.

Accordingly, the eyelid shape parameters, $\vec{U}$, can be estimated by the mapping matrix, A, given an eye pose function, $\vec{\Theta}$, determined from the eye pose angular determinations. In various implementations, the mapping matrix, A, can be determined from training data that includes eye pose and eyelid shape determinations of an individual or group of individuals. For example, the training data can be acquired by observing and determining eye poses and eyelid shapes for an individual (or group of individuals) for a period of time as the individual's eye moves in different gaze directions. During these observations, both the pose of the eye and the position of the eyelids are recorded. Such data points can be used to determine the mappings $u(\theta, \phi)$, $v(\theta, \phi)$, and $k(\theta, \phi)$; for example, by regression of parameters characterizing those functions. In this example, the values $a_{ij}$ are the coefficients to be found by fitting the available training data (e.g. by regression or any other statistical fitting or optimization technique).

Other models of eyelid shape are possible, including non-parametric models. Also, the relationship between eyelid shape and eye pose can be determined by implicit learned mappings such as neural networks.

In some implementations, since the face is symmetric around a mid-line between the two eyes, separate models of the left and the right eyes are not used. Instead, an image of one eye (e.g., the right eye) is transformed into a horizontally reflected mirror image so that the mirror image and an image of the other eye (e.g., the left eye) are similar or indistinguishable. That is, mirror images of one eye (e.g., the right eye) and images of the other eye (e.g., the left eye) may be similar or indistinguishable. The fitting procedure can then be performed on a single eye shape (e.g., the left eye shape), which effectively doubles the number of eyes or eye images that can be used in the fitting procedure. In effect, such implementations determine a general eyelid shape model that can be used for either left eye or right eye. For example, given an eyelid shape model for left eyes, data for right eyes (e.g., eye images and eye pose determinations) can be reflected, then the left-eye model is applied, then the corresponding eyelid shape determination is reflected back again.

In some implementations, the eye pose determined from the eye image at block 212 is re-determined based at least in part on the eyelid shape estimated at block 220. The re-determined eyelid shape can be compared to the initial eyelid shape (from block 212), and if substantially similar (e.g., differences in the parametric representations are less than a threshold), the routine 200 can determine that the eye pose determined is sufficiently accurate. Thus, the routine 200 can (optionally) verify consistency of the eye pose determination.

Thus, as can be seen from this example, the eyelid shape can be fitted in accordance with the mapping of an eye pose determination to an eyelid shape. Said differently, the routine 200 can use an eye pose determination to fit a curve that is the shape of an eyelid. Thereafter, at block 224, routine 200 ends.

In various embodiments, the routine 200 may be performed by a hardware processor of a head mounted display system, for example, as described below with reference to FIG. 6. In other embodiments, a remote computing device with computer-executable instructions can cause the head mounted display system to perform the routine 200. In some embodiments of the routine 200, elements may occur in sequences other than as described above.

Example of an Eyelid Shape Estimation

Figure 3:
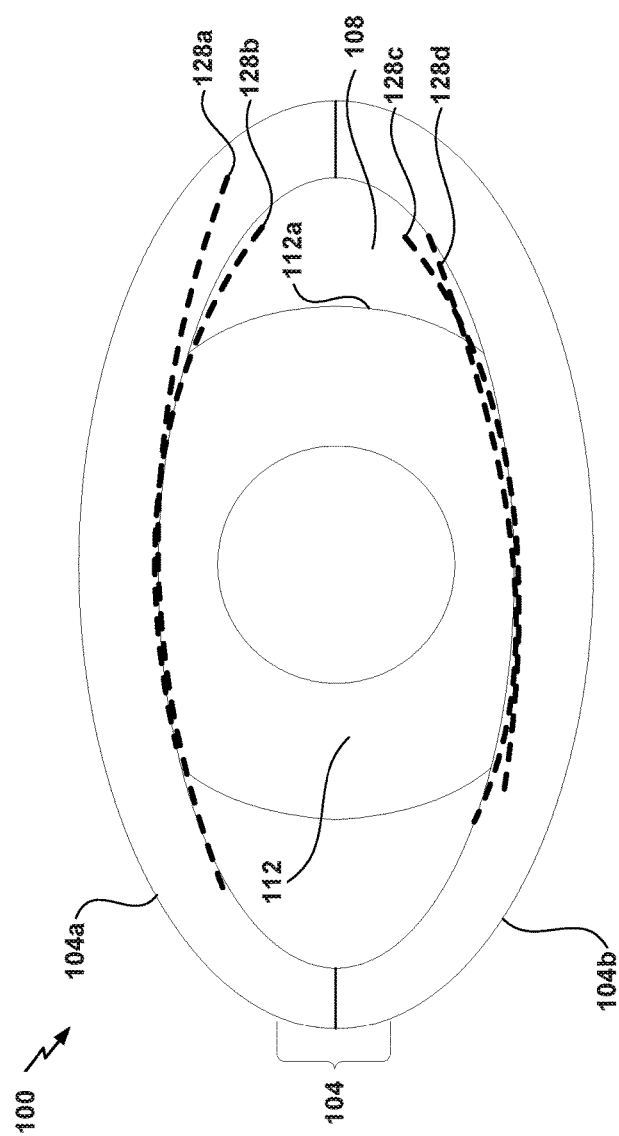
FIG. 3 schematically illustrates an example of eyelid shape estimation.

FIG. 3 schematically illustrates an example of eyelid shape estimation using the eyelid shape estimation routine described in FIG. 2 above. For example, FIG. 3 illustrates the result at block 220 when an eyelid shape is fitted to a curve determined to be the eyelid shape based on an eye pose mapping. As depicted in FIG. 3, a parabola fit line 128a can fit the upper eyelid 104a; and a parabolic fit line 128c can fit the lower eyelid 104b. In some cases, multiple parabolic fit lines are mapped by routine 200. For example, a different regression or statistical determination can be used to determine the mapping matrix A. Accordingly, as illustrated, a parabolic fit line 128b shows another fit of the upper eyelid 104a; and a parabolic fit line 128d shows another fit of the lower eyelid 104b.

During the fitting process described herein, a fit to an eyelid may result in a line that is curved in the wrong direction for a particular eyelid. For example, an upper eyelid generally is curved downwards and a lower eyelid is generally curved upwards. If a fit line has the wrong curvature for a particular eyelid (e.g., an upward curvature for an upper eyelid or a downward curvature for a lower eyelid), the fit line can be rejected from the routine 200 (e.g., at block 220), thereby saving processing resources and improving efficiency of the process.

Accordingly, in some embodiments, a fit line can be rejected based on the sign of the curvature of the fit line; with positive curvatures being rejected for upper eyelids and negative curvatures being rejected for lower eyelids. In various implementations, the curvature of the fit line is determined as part of the fitting process (e.g., a particular fitting coefficient may be representative of the curvature), or the curvature of the fit line can be determined by taking the second derivative of the function representing the fit line.

Although the foregoing examples have been described in the context of fitting a parabola to an eyelid, this is for illustration and is not intended to be limiting. In other implementations, any suitable functional form for an eyelid can be used during the fitting procedure. The functional form for an upper eyelid may, but need not, be different from the functional form for a lower eyelid. The functional form for an eyelid can be a conic form (which includes a parabola as a particular case), a polynomial (e.g., with degree higher than two which is representative of the conic form), a spline, a rational function, or any other appropriate function.

Example Eyelid Shape Estimation Algorithm

The following pseudo-code provides another example of an eyelid shape estimation process. The process begins with eye images.

A mapping matrix, A, can be determined with the following:

(1) Collect a data set D of eye images.
(2) For each image:

(2a) compute the eye pose determination $\vec{\Theta}$ of the eye in the frame of the user's head.

(2b) compute a best fit to an eyelid, and extract eye lid function parameters $\vec{U}$ for this fit (the computed fit $\vec{U}$ for the computed eye pose determination $\vec{\Theta}$ is an example of training data).

(3) Given a mapping matrix A with parameters $\{a_{i,j}\}$, determine the optimal values of the parameters $\{a_{i,j}\}$ for fitting the training data to the model $\vec{U}=A\vec{\Theta}$.

An eyelid shape can be estimated for an eyelid corresponding to the mapping matrix A:

(4) For an eye image, compute the eye pose determination $\vec{\Theta}^*$ of the eye in head coordinates.

(5) Using the matrix A, estimate the eyelid function parameters $\vec{U}^*$ using the model $\vec{U}=A\vec{\Theta}^*$.

(6) Perform one or both of the following:

(6a) Compute an image mask using $\vec{U}^*$ for the corresponding eyelid and extract the iris pixels using this mask; or (6b) Using the eye lid function parameters $\vec{U}^*$, initialize a subsequent algorithm by which the eyelid boundary determined can be further refined.

This estimation process can be repeated for the other eyelids.

As discussed herein, certain implementations can perform the inverse of the foregoing by determining an eyelid shape and then estimating an eye pose from the estimated eyelid shape.

Example Applications of Eyelid Shape Estimation for Video Processing

Systems and methods using eyelid shape estimation permit many of the classical problems in image processing to be improved, when addressed within the context of video imagery. Additionally other problems can be addressed. For example, eyelid shape estimation can be used for image classification from a video (e.g., identifying the iris of the eye), as well as for the localization of specific object types within one or more frames of the video (e.g., the location of the upper eyelid). As another example, eyelid shape estimation can be applied to a video for the application of eye-tracking (e.g., determining the orientation or direction of an eye).

In some such applications, as will be further discussed below, a wearable display system can include a processor that performs eyelid shape estimation on video data acquired by an image capture device operatively coupled to (e.g., attached to or included in) the wearable display system. The image capture device may acquire video of the wearer's eye or other components of the wearer's body (e.g., a hand or a finger) for use in estimating eyelid shape.

The use of eyelid shape estimation advantageously permits recognition of eyelids in a video (e.g., acquired from an image capture device in a wearable display system), which may permit improved recognition or classification of objects in the video such as biometric information. For example, a conventional biometric template may have difficulty in determining segmentation of the eye. However, the eyelid shape estimation approach described herein can better distinguish between boundary of the pupil and the boundary of the iris, because (generally) a portion of the iris will be occluded by an eyelid, whereas the pupil (generally) will not be occluded. Thus, by providing the ability to extract biometric information, eyelid shape estimation, as described in FIG. 2 and illustrated in FIG. 3, can better recognize portions of the eye that are not occluded by the eyelid and can provide for more accurate iris segmentation used in biometric extraction. The eyelid shape estimation techniques disclosed herein can be used by a head mounted display (e.g., the head mounted display in FIG. 6) for biometric extraction or identification (e.g., iris identification).

Example Eye Pose Estimation Routine

In various embodiments, a routine for eye pose estimation based on eyelid shape can be performed analogously to the routine 200 (in which eyelid shape is estimated from eye pose). For example, rather than the eye pose of the eye image being determined at block 212, the eyelid shape can be determined at block 212 using the eye image. Eyelid shapes can be represented parametrically (e.g., as (u, v, k) for parabolic parameterizations). Eye pose (e.g., the angles (θ, φ)) can be determined as a function of the parametric representation of the eyelids. For example, the eye pose angles can be estimated as a functional form (e.g., linear, quadratic, polynomial, or other) of the eyelid shape parameters. In effect, the inverse of the techniques described with reference to Eq. (2) can be used to estimate eye pose from the eyelid shape determinations. In some implementations, the eyelid shape can be re-determined using the estimated eye pose direction, and a comparison between the initial eyelid shape and the re-determined eyelid shape can be performed to verify the consistency of the eye pose estimation. For example, if the re-determined eyelid shape is substantially the same as the initial eyelid shape determination (e.g., smaller than a threshold difference), then the eye pose estimate is likely to be accurate.

Figure 4:
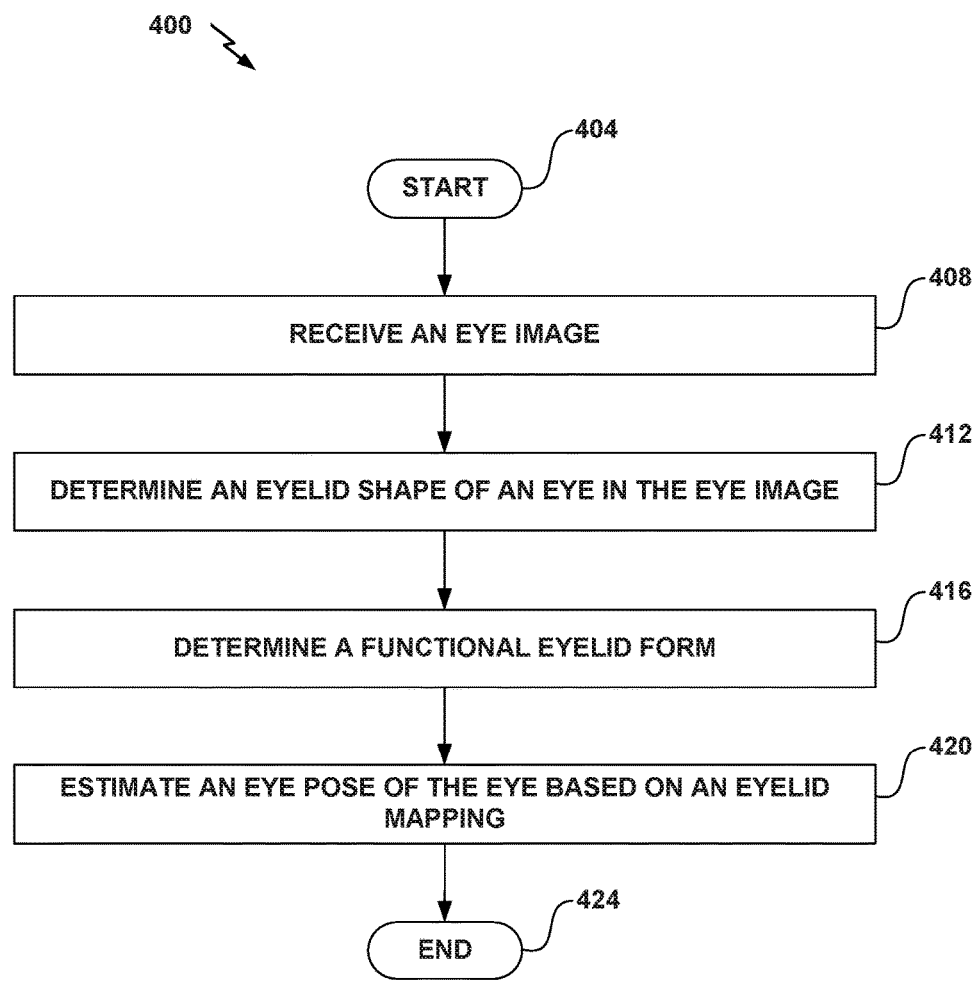
FIG. 4 is a flow diagram of an example eye pose estimation routine.

FIG. 4 is a flow diagram of an example eye pose estimation routine 400. The eye pose estimation routine 400 can be implemented by a processor such as a hardware processor. Eye pose estimation can also be referred to as eye pose detection. Routine 400 begins at block 404. At block 408, an eye image is received. The eye image can be received from a variety of sources including, for example, an image capture device, a head mounted display system, a server, a non-transitory computer-readable medium, or a client computing device (e.g., a smartphone). In some implementations, the eye image can be extracted from a video.

At block 412, an eyelid of the eye image is determined. For example, edge detection can be applied to the eye image to determine the eyelid. Edge detection can be applied by various edge detectors, edge detection algorithms, or filters. For example, a Canny Edge detector can be applied to the image to detect edges in lines of the image. Edges are points located along a line that correspond to the local maximum derivative. For example, the upper eyelid 104a or the lower eyelid 104b can be located using a Canny edge detector.

In some implementations, the eye image can optionally be pre-processed with a filter to remove high-frequency noise from the image. The filter can be a low-pass filter or a morphological filter such as an open filter. The filter can remove high-frequency noise from the boundary between the iris 112 and the eyelid, thereby removing noise that can hinder eyelid shape determination.

At block 416, the functional form of an eyelid can be determined using the eyelid determined at block 412. In various implementations, this functional form of the eyelid can be represented using curves. In a non-limiting example implementation, the eyelid can be represented by a polynomial form such as a parabola (quadratic form). Other implementations are also possible. In other implementations, any suitable mathematical formulation or curve can be used to represent the eyelid. That is, the representation of the eyelid curve need not be a polynomial form of any order. For example, a curve can be another non-linear mathematical expression. Different formulations or curves are possible for each eyelid. As discussed below, non-parametric representations of eyelid shape can be used (e.g., neural network classifiers). Although the subsequent example will be described in the context of three parameters fitting a parabolic curve, this is for illustration and is not intended to be limiting. In other implementations, any suitable number of parameters can be used to fit the chosen curve. In addition, any functional form other than a parabolic form can be used.

The eyelid determined at block 412 can be represented in a coordinate system, for example, represented by coordinates, x and y, with the coordinate system centered at the center of the pupil when the pupil is in a natural resting orientation, with x representing the horizontal direction and y representing the orthogonal vertical direction. In an example of a parabolic curve fitting an eyelid shape, the parabolic curve can be parameterized by three parameters. Illustratively, these three parameters can be referred to as the horizontal shift u; the vertical shift v; and the curvature k of the eyelid. Eq. (1) above shows an equation for a parabola for the eyelid shape.

Eyelid shape parameters (e.g., (u, v, k)) can be used to determine corresponding eye pose parameters (e.g., ($\theta$, $\phi$)). From one perspective, this can be viewed as a mapping from the three-parameter space (u, v, k) to the two-parameter space ($\theta$, $\phi$). In various implementations, this mapping can be used to determine the eye pose, or to generating an initial approximation of eye pose parameters, which may be used to improve the performance of other eye pose determination algorithms. As discussed below, other implementations are possible. A mapping can also be referred to as a mapping function. Although the subsequent example will be described in the context of determining an eye pose using an eyelid mapping, this is for illustration and is not intended to be limiting. In other implementations, any mapping function (parametric or non-parametric) based on eyelid shape parameters can be used to determine eye pose. In addition, varying functional forms to perform this mapping are possible. Generally speaking, the mapping function associates a relationship of an eyelid shape coordinate system to an eye pose coordinate system. Illustratively, an eyelid functional form represented by Q parameters and can be mapped to an eye pose determination represented as P parameters. For example, the eyelid functional form can be represented by Q parameters, where Q can be the width of pixels in a display (e.g., display 608 in FIG. 6 below).

At block 420, an eye pose can be determined based on an eyelid mapping. Continuing in the example of two-parameter space, a mapping can be decomposed into two separate mappings: $\theta$(u, v, k) and $\phi$(u, v, k). Such decompositions can be modeled as polynomials of a specific order. One possible parameterization for these functions can be of the form, $\vec{\Theta}=B\vec{U}$, where the respective elements of $\vec{\Theta}=B\vec{U}$ have the following definition:

$$\begin{bmatrix} \theta^2 \\ \theta \\ \phi^2 \\ \phi \\ 1 \end{bmatrix} = \begin{bmatrix} b_{00} & b_{01} & b_{02} \\ b_{10} & b_{11} & b_{12} \\ b_{20} & b_{21} & b_{22} \\ b_{30} & b_{31} & b_{32} \\ b_{40} & b_{41} & b_{42} \end{bmatrix} \begin{bmatrix} u \\ v \\ k \end{bmatrix}. \qquad \text{Eq. (6)}$$

In Eq. (6), $\vec{\Theta}$ is the column vector [$\theta$ $\phi$] of eye pose parameters to be determined from eyelid shape determinations of (u, v, k). The mapping B in Eq. (6) relates the angular eye pose parameters to a polynomial (linear, in this example) function $\vec{U}$ of the eyelid shape parameters. In other embodiments, the function $\vec{U}$ can be a polynomial of different degree than one (e.g., 2, 3, 4, 5, or more), a non-polynomial function, a rational function, or any other appropriate functional form. Although the relationship between $\vec{U}$ and $\vec{\Theta}$ is linear in Eq. (6), in other implementations, non-linear relationships can be utilized.

In the example of two-parameter space, the mappings $\theta$(u, v, k) and $\phi$(u, v, k) have the following definitions:

$$\theta(u, v, k) = \begin{bmatrix} b_{10} & b_{11} & b_{12} \end{bmatrix} \begin{bmatrix} u \\ v \\ k \end{bmatrix}, \quad \text{Eq. (7)}$$

and $$\phi(u, v, k) = \begin{bmatrix} b_{30} & b_{31} & b_{32} \end{bmatrix} \begin{bmatrix} u \\ v \\ k \end{bmatrix}. \quad \text{Eq. (8)}$$

Accordingly, the eye pose parameters, $\vec{\Theta}$, can be estimated by the mapping matrix, B, given an eyelid shape function, $\vec{U}$, determined from the eyelid shape determinations. In various implementations, the mapping matrix, B, can be determined from training data that includes eye pose and eyelid shape determinations of an individual or group of individuals. For example, the training data can be acquired by observing and determining eye poses and eyelid shapes for an individual (or group of individuals) for a period of time as the individual's eye moves in different gaze directions. During these observations, both the pose of the eye and the position of the eyelids are recorded. Such data points can be used to determine the mappings $\theta(u, v, k)$ and $\phi(u, v, k)$; for example, by regression of parameters characterizing those functions. In this example, the values $b_{ij}$ are the coefficients to be found by fitting the available training data (e.g. by regression or any other statistical fitting or optimization technique). In some implementations, the relationship between eyelid shape and eye pose can be determined by mappings learned by neural networks.

In some implementations, since the face is symmetric around a mid-line between the two eyes, separate models of the left and the right eyes are not used. Instead, an image of one eye (e.g., the right eye) is transformed into a mirror image so that the mirror image and an image of the other eye (e.g., the left eye) are similar or indistinguishable. That is, mirror images of one eye (e.g., the right eye) and images of the other eye (e.g., the left eye) may be similar or indistinguishable. The functional eyelid form can be performed on a single eye shape (e.g., the left eye shape), which effectively doubles the number of eyes or eye images that can be used in determining the mapping B. In effect, such implementations determine a general eyelid shape model that can be used for either left eye or right eye. For example, given an eyelid shape model for left eyes, data for right eyes (e.g., eye images and eyelid shape determinations) can be reflected, then the left-eye model is applied, then the corresponding eyelid shape determination is reflected back again.

In some implementations, the functional eyelid form determined from the eye image at block 416 is re-determined based at least in part on the eye pose determined at block 420. The re-determined eyelid functional form can be compared to the initial eyelid functional (from block 416), and if substantially similar (e.g., differences in the parametric representations are less than a threshold), the routine 400 can determine that the eyelid functional form determination is sufficiently accurate. Thus, the routine 400 can (optionally) verify consistency of the eyelid shape determination. Thereafter, at block 424, routine 400 ends.

In various embodiments, the routine 400 may be performed by a hardware processor of a head mounted display system, for example, as described below with reference to FIG. 6. In other embodiments, a remote computing device with computer-executable instructions can cause the head mounted display system to perform the routine 400. In some embodiments of the routine 400, elements may occur in sequences other than as described above.

Example of an Eye Pose Estimation

Figure 5:
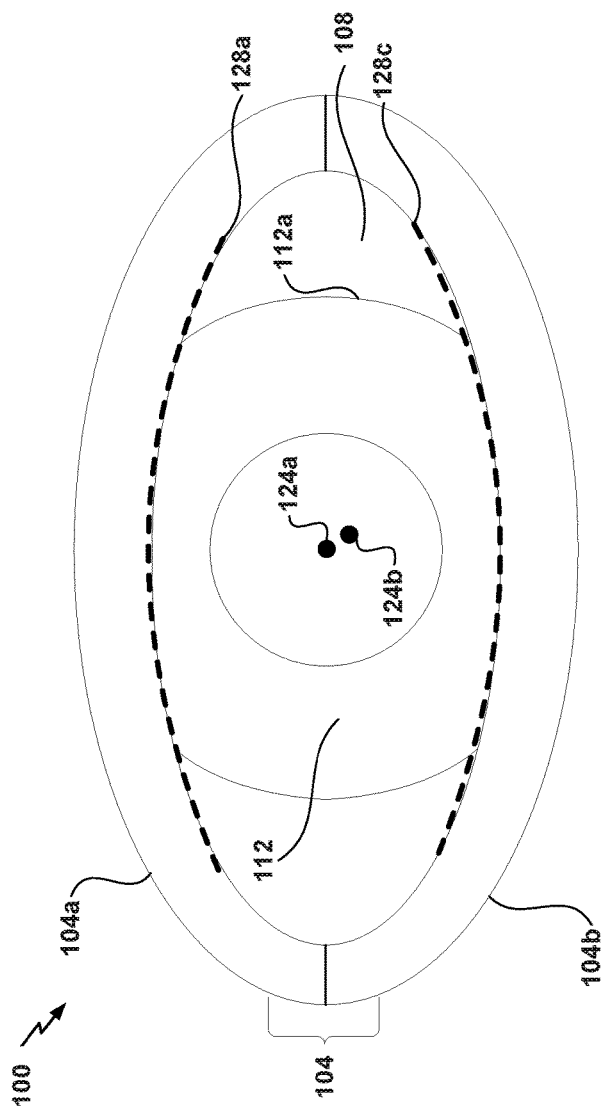
FIG. 5 schematically illustrates an example of eye pose estimation.

FIG. 5 schematically illustrates an example of eye pose estimation using the eye pose estimation routine described in FIG. 4 above. For example, FIG. 4 illustrates the result at block 420 when an eye pose is estimated based on an eyelid mapping. As depicted in FIG. 5, a parabola fit line 128a can fit the upper eyelid 104a; and a parabolic fit line 128c can fit the lower eyelid 104b. One or both of the parabola fit line 128a and the parabola fit line 128b can be used to estimate the eye pose. For example, the parabola fit line 128a can be used to estimate the eye pose 124a, and the parabola fit line 128b can be used to estimate the eye pose 124b. As another example, the parabola fit line 128a and the parabola fit line 128b can be used to estimate the eye pose 124a. Multiple eye poses can be estimated by routine 400 from one eyelid shape. For example, two different regression or statistical determinations can be used to determine the mapping matrix B and the mapping matrix B'. The mapping matrix B can be used to estimate the eye pose 124a, and the mapping matrix B' can be used to estimate the eye pose 124b.

Example Applications of Eye Pose Estimation for Video Processing

Systems and methods using eye pose estimation permit many of the classical problems in image processing to be improved, when addressed within the context of video imagery. Additionally other problems can be addressed. For example, eye pose estimation can be used for image classification from a video (e.g., identifying the iris of the eye), as well as for the localization of specific object types within one or more frames of the video (e.g., the location of the iris). As another example, eye pose estimation can be applied to a video for the application of eye-tracking (e.g., determining the orientation or direction of an eye).

In some such applications, as will be further discussed below, a wearable display system can include a processor that performs eye pose estimation on video data acquired by an image capture device operatively coupled to (e.g., attached to or included in) the wearable display system. The image capture device may acquire video of the wearer's eye or other components of the wearer's body (e.g., a hand or a finger) for use in estimating eye pose.

The use of eye pose estimation advantageously permits recognition of eye poses in a video (e.g., acquired from an image capture device in a wearable display system), which may permit improved recognition or classification of objects in the video such as biometric information. For example, a conventional biometric template may have difficulty in determining segmentation of the eye. However, the eye pose estimation approach described herein can enable better iris segmentation because the eye pose is related to the location and orientation of the iris. Thus, by providing the ability to extract biometric information, eye pose estimation, as described in FIG. 4 and illustrated in FIG. 5, can better determine eye pose and can provide for more accurate iris segmentation used in biometric extraction. The eye pose estimation techniques disclosed herein can be used by a head mounted display (e.g., such as in FIG. 6) for biometric extraction or identification (e.g., iris identification).

Example Wearable Display System Using Eyelid Shape Estimation

In some embodiments, display systems can be wearable, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 6:
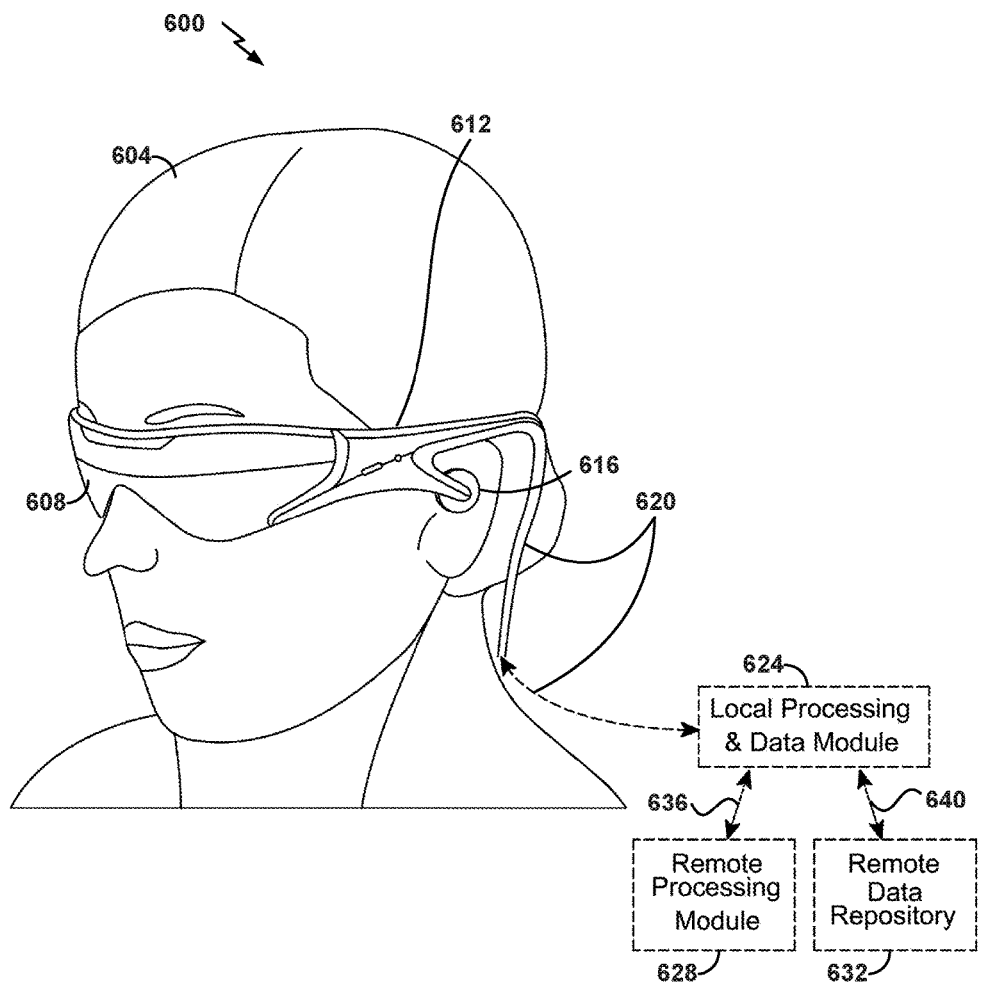
FIG. 6 schematically illustrates an example of a wearable display system.

FIG. 6 illustrates an example of a wearable display system 600 that can be used to present a VR, AR, or MR experience to the wearer 604. The wearable display system 600 may be programmed to perform eye pose determination, eyelid shape estimation, eyelid shape determination, or eye pose estimation to provide any of the applications or embodiments described herein. The display system 600 includes a display 608, and various mechanical and electronic modules and systems to support the functioning of that display 608. The display 608 may be coupled to a frame 612, which is wearable by a display system wearer or viewer 604 and which is configured to position the display 608 in front of the eyes of the wearer 604. The display 608 may be a light field display. In some embodiments, a speaker 616 is coupled to the frame 612 and positioned adjacent the ear canal of the user in some embodiments, another speaker, not shown, is positioned adjacent the other ear canal of the user to provide for stereo/shapeable sound control. The display 608 is operatively coupled 620, such as by a wired lead or wireless connectivity, to a local data processing module 624 which may be mounted in a variety of configurations, such as fixedly attached to the frame 612, fixedly attached to a helmet or hat worn by the user, embedded in headphones, or otherwise removably attached to the user 604 (e.g., in a backpack-style configuration, in a belt-coupling style configuration).

The local processing and data module 624 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 612 or otherwise attached to the wearer 604), such as image capture devices (such as cameras), microphones, inertial measurement units, accelerometers, compasses, GPS units, radio devices, and/or gyros; and/or (b) acquired and/or processed using remote processing module 628 and/or remote data repository 632, possibly for passage to the display 608 after such processing or retrieval. The local processing and data module 624 may be operatively coupled by communication links 636, 640, such as via a wired or wireless communication links, to the remote processing module 628 and remote data repository 632 such that these remote modules 628, 632 are operatively coupled to each other and available as resources to the local processing and data module 624. The image capture device(s) can be used to capture the eye images used in the eyelid shape estimation procedures.

In some embodiments, the remote processing module 628 may comprise one or more processors configured to analyze and process data and/or image information such as video information captured by an image capture device. The video data may be stored locally in the local processing and data module 624 and/or in the remote data repository 632. In some embodiments, the remote data repository 632 may comprise a digital data storage facility, which may be available through the internet or other networking configuration in a "cloud" resource configuration. In some embodiments, all data is stored and all computations are performed in the local processing and data module 624, allowing fully autonomous use from a remote module.

In some implementations, the local processing and data module 624 and/or the remote processing module 628 are programmed to perform embodiments of determining an eye pose and estimating an eyelid shape as described herein. For example, the local processing and data module 624 and/or the remote processing module 628 can be programmed to perform embodiments of the process 200 described with reference to FIG. 2. The local processing and data module 624 and/or the remote processing module 628 can be programmed to use the eyelid shape estimation techniques disclosed herein in biometric extraction, for example to identify or authenticate the identity of the wearer 604, or in eye gaze or pose determination or eyelid shape estimation, for example to determine a direction toward which each eye is looking. The image capture device can capture video for a particular application (e.g., video of the wearer's eye for an eye-tracking application or video of a wearer's hand or finger for a gesture identification application). The video can be analyzed using the eyelid shape estimation techniques by one or both of the processing modules 624, 628. With this analysis, processing modules 624, 628 can perform eyelid shape estimation or detection and/or biometric extraction, eye pose determination, etc. As an example, the local processing and data module 624 and/or the remote processing module 628 can be programmed to store the mapping matrix, A, as a look-up table in remote data repository 632. In some cases, off-loading at least some of the eyelid shape estimation to a remote processing module (e.g., in the "cloud") may improve efficiency or speed of the computations. Various parameters for eyelid shape estimation (e.g., weights, bias terms, random subset sampling factors, number, and size of filters (e.g., Sobel derivative operator), etc.) can be stored in data modules 624 and/or 632.

As an illustrative example of image processing, processing module 624 can extract and formulate the biometric information from an eye image received from an image capture device into a numerical representation. Processing module 624 can also perform numerical calculations to represent the mapping matrix described in FIG. 2 as a transfer function that transforms the biometric information extracted from an eye image into an image processing result. In turn, the image processing result can be used for further processing, for example, in eyelid shape estimation method as described herein. The image processing result and the transfer function can both be stored in remote data repository 632. While this illustrative example of image processing is processed with processing module 624, in various implementations, processing module 628 can perform such image processing of an eye image. Additionally, processing modules 624, 628 can, together perform such image processing of an eye image.

The results of the video analysis (e.g., the estimated shape of the eyelid) can be used by one or both of the processing modules 624, 628 for additional operations or processing. For example, in various applications, biometric identification, eye-tracking, recognition, or classification of objects, poses, etc. may be used by the wearable display system 600. For example, video of the wearer's eye(s) can be used for eyelid shape estimation, which, in turn, can be used by the processing modules 624, 628 to determine the direction of the gaze of the wearer 604 through the display 608. The processing modules 624, 628 of the wearable display system 600 can be programmed with one or more embodiments of eye pose determination or eyelid shape estimation to perform any of the video or image processing applications described herein.

Additional Aspects

The eyelid shape estimation techniques described herein can be applied to an image (e.g., from a video) of an eye for processing the image of the eye.

In a 1st aspect, a method for eyelid shape estimation is disclosed. The method is performed under control of a hardware processor and comprises: detecting a pupillary boundary of an eye using an edge detector; determining an eye pose of the eye using the pupillary boundary, wherein an eye pose coordinate system of the eye pose comprises an azimuthal angle and a zenithal angle of the eye relative to a resting orientation of the eye, wherein a functional relationship between the eye pose coordinate system and an eyelid shape coordinate system comprises a mapping matrix, and wherein the eyelid shape coordinate system comprises a horizontal shift, a vertical shift, and a curvature of the eye; estimating an eyelid shape of the eye based at least in part on the eye pose and the functional relationship; and fitting a parabolic curve of an eyelid shape of the eye based on the eyelid shape.

In a 2nd aspect, the method of aspect 1, wherein fitting the parabolic curve comprises: fitting a new parabolic curve of the eyelid of the eye based on the eyelid shape if the curvature of the parabolic curve is positive and the eyelid is an upper eyelid of the eye or if the curvature of the parabolic curve is negative and the eyelid is a lower eyelid.

In a 3rd aspect, the method of any one of aspects 1-2, further comprising: applying a morphological filter to the eye image prior to detecting the pupillary boundary of the eye using the edge detector.

In a 4th aspect, the method of any one of aspects 1-3, wherein the edge detector comprises a Canny edge detector.

In a 5th aspect, the method of any one of aspects 1-4, wherein the mapping matrix is determined by a regression analysis of eyelid shapes and eye poses.

In a 6th aspect, a hardware processor is disclosed. The hardware processor is programmed to perform the method of any one of aspects 1-5.

In a 7th aspect, a wearable display system for eyelid shape estimation is disclosed. The wearable display system comprises: the hardware processor of claim 6; and an image capture device configured to capture the eye image and to transmit the eye image to the hardware processor.

In a 8th aspect, the wearable display system of aspect 7, wherein the hardware processor is further programmed to: determine biometric information of the eye.

In a 9th aspect, a head mounted display system is disclosed. The head mounted display system comprises: an image capture device configured to capture an eye image; non-transitory memory configured to store an eyelid shape mapping model; and a hardware processor in communication with the non-transitory memory, the hardware processor programmed to: receive the eye image from the image capture device; determine an eye pose of an eye in the eye image; and estimate an eyelid shape of the eye based at least in part on the eye pose and an eyelid shape mapping model, wherein the eyelid shape mapping model relates the eyelid shape and the eye pose.

In a 10th aspect, the head mounted display system of aspect 9, wherein the eye pose comprises a measurement of an azimuthal angle and a zenithal angle of the eye relative to a resting orientation of the eye.

In a 11th aspect, the head mounted display system of any one of aspects 9-10, wherein the eyelid shape comprises a determination of a horizontal shift, a vertical shift, and a curvature of the eye.

In a 12th aspect, the head mounted display system of any one of aspects 9-11, wherein the eyelid shape mapping model comprises a parametric relationship between the eye pose and the eyelid shape.

In a 13th aspect, the head mounted display system of any one of aspects 9-12, wherein the parametric relationship comprises a parabola or a polynomial.

In a 14th aspect, the head mounted display system of any one of aspects 9-13, wherein the eyelid shape mapping model comprises a neural network.

In a 15th aspect, the head mounted display system of any one of aspects 9-14, wherein the hardware processor is further programmed to: determine biometric data of the eye using the eyelid shape.

In a 16th aspect, the head mounted display system of aspect 15, wherein the biometric data comprises an iris code of the eye.

In a 17th aspect, a method for estimating an eyelid shape from an eye image is disclosed. The method is performed under control of a hardware processor and comprises: determining an eye pose of an eye in an eye image; and estimating an eyelid shape based on the eye pose.

In a 18th aspect, the method of aspect 17, wherein the eye pose comprises at least two angular deviations of the eye from a resting orientation of the eye.

In a 19th aspect, the method of any one of aspects 17-18, wherein estimating the eyelid shape comprises applying an eyelid shape mapping model to the eye pose.

In a 20th aspect, the method of aspect 19, wherein the eyelid shape mapping model comprises a parametric relationship between the eye pose and the eyelid shape.

In a 21st aspect, the method of aspect 20, wherein the eyelid shape is represented by a polynomial.

In a 22nd aspect, the method of aspect 21, wherein the eyelid shape mapping model comprises a neural network.

In a 23rd aspect, the method of any one of aspects 17-22, further comprising: re-determining the eye pose based on the eyelid shape; and verifying consistency of the determined eye pose and the re-determined eye pose.

In a 24th aspect, a hardware processor is disclosed. The hardware processor is programmed to perform the method of any one of aspects 17-23.

In a 25th aspect, a wearable display system for eyelid shape estimation is disclosed. The wearable display system comprises: the hardware processor of claim 24; and an image device configured to capture the eye image and to transmit the eye image to the hardware processor.

In a 26th aspect, a method for training an eyelid shape mapping model for eyelid shape estimation is disclosed. The method is under control of a hardware processor and comprises: accessing training data that relates eyelid shapes to eye poses; training an eyelid shape mapping model on the training data; and outputting the trained eyelid shape mapping model.

In a 27th aspect, the method of aspect 26, further comprising: acquiring eye image data comprising a plurality of images of an eye pointing in a plurality of directions; and analyzing the eye image data to determine the training data.

In a 28th aspect, the method of aspect 27, wherein analyzing the eye image data comprises: generating eye image data comprising horizontally reflected mirror images of a right eye and images of a left eye, or horizontally reflected mirror images of a left eye and images of a right eye.

In a 29th aspect, the method of any one of aspects 26-28, wherein training the eyelid shape mapping model on the training data comprises applying a statistical model or a neural network to the training data.

In a 30th aspect, a method for processing an eye image is disclosed. The method is performed under control of a hardware processor and comprises: detecting a boundary between an eyelid of an eye and an iris of the eye using an edge detector; determining an eyelid shape of the eye using the boundary between the eyelid of the eye and the iris of the eye, wherein an eyelid shape coordinate system of the eyelid shape comprises a horizontal shift, a vertical shift, and a curvature of the eye, wherein a functional relationship between the eyelid shape coordinate system and an eye pose coordinate system comprises a mapping matrix, and wherein the eye pose coordinate system comprises an azimuthal deflection angle and a zenithal deflection angle of the eye relative to a resting orientation of the eye; estimating an eye pose of the eye based at least in part on the eyelid shape and the functional relationship.

In a 31st aspect, the method of aspect 30, wherein determining the eyelid shape of the eye comprises fitting a parabolic curve to the boundary between the eyelid of the eye and the iris of the eye.

In a 32nd aspect, the method of any one of aspects 30-31, further comprising: applying a morphological filter to the eye image prior to detecting the boundary between the eyelid of the eye and the iris of the eye using the edge detector.

In a 33rd aspect, the method of any one of aspects 30-32, wherein the edge detector comprises a Canny edge detector.

In a 34th aspect, the method of any one of aspects 30-33, wherein the mapping matrix is determined by a regression analysis of eye poses and eyelid shapes.

In a 35th aspect, a hardware processor is disclosed. The hardware processor is programmed to perform the method of any one of aspects 30-34.

In a 36th aspect, a wearable display system for eye pose estimation is disclosed. The wearable display system comprises: the hardware processor of claim 35; and an image device configured to capture the eye image and to transmit the eye image to the hardware processor.

In a 37th aspect, the wearable display system of aspect 36, wherein the hardware processor is further programmed to: determine biometric information of the eye.

In a 38th aspect, the wearable display system of aspect 37, wherein the biometric information comprise an iris code of the eye.

In a 39th aspect, a head mounted display system is disclosed. The head mounted display system comprises: an image capture device configured to capture an eye image; non-transitory memory configured to store an eye pose mapping model; and a hardware processor in communication with the non-transitory memory, the hardware processor programmed to: receive the eye image from the image capture device; determine an eyelid shape of an eye in the eye image; and estimate an eye pose of the eye based at least in part on the eyelid shape and the eye pose mapping model, wherein the eyelid shape mapping model relates the eyelid shape to the eye pose.

In a 40th aspect, the head mounted display system of aspect 39, wherein the eye pose comprises a measurement of an azimuthal angle and a zenithal angle of the eye relative to a resting orientation of the eye.

In a 41st aspect, the head mounted display system of any one of aspects 39-40, wherein the eyelid shape comprises a determination of a horizontal shift, a vertical shift, and a curvature of the eye.

In a 42nd aspect, the head mounted display system of any one of aspects 39-41, wherein the eye pose mapping model comprises a parametric relationship between the eyelid shape and the eye pose.

In a 43rd aspect, the head mounted display system of any one of aspects 39-42, wherein the parametric relationship comprises a parabola.

In a 44th aspect, the head mounted display system of any one of aspects 39-43, wherein the eye pose mapping model comprises a neural network.

In a 45th aspect, the head mounted display system of any one of aspects 39-44, herein the hardware processor is further programmed to: determine biometric data of the eye using the eye pose.

In a 46th aspect, a method for estimating an eye pose from an eyelid shape is disclosed. The method is performed under control of a hardware processor and comprises: determining an eyelid shape of an eye in an eye image; and estimating an eye pose based at least partly on the eyelid shape.

In a 47th aspect, the method of aspect 46, wherein estimating the eye pose comprises applying an eye pose mapping model to the eyelid shape.

In a 48th aspect, the method of any one of aspects 46-47, wherein estimating the eye pose comprises applying an eye pose mapping model to the eyelid shape.

In a 49th aspect, the method of aspect 48, wherein the eye pose mapping model comprises a parametric relationship between the eyelid shape and the eye pose.

In a 50th aspect, the method of aspect 49, wherein the eyelid shape is represented by a polynomial.

In a 51st aspect, the method of aspect 50, wherein the eyelid shape mapping model comprises a neural network.

In a 52nd aspect, the method of any one of aspects 46-51, further comprising: re-determining the eyelid shape based on the eye pose; and verifying consistency of the determined eyelid shape and the re-determined eyelid shape.

In a 53rd aspect, a hardware processor is disclosed. The hardware processor is programmed to perform the method of any one of aspects 46-52.

In a 54th aspect, a wearable display system for detecting an eyelid shape is disclosed. The wearable display system comprises: the hardware processor of aspect 53; and an image device configured to capture the eye image and to transmit the eye image to the hardware processor.

In a 55th aspect, a method for training an eye pose mapping model for estimating eye pose from an eyelid shape is disclosed. The method is under control of a hardware processor and comprises: accessing training data that relates eyelid shapes to eye poses; training an eye pose mapping model on the training data; and outputting the trained eye pose mapping model.

In a 56th aspect, the method of aspect 55, further comprising: acquiring eye image data comprising a plurality of images of an eye pointing in a plurality of directions; and analyzing the eye image data to determine the training data.

In a 57th aspect, the method of aspect 56, wherein analyzing the eye image data comprises: generating eye image data comprising horizontally reflected mirror images of a right eye and images of a left eye, or horizontally reflected mirror images of a left eye and images of a right eye.

In a 58th aspect, the method of any one of aspects 55-57, wherein training the eye pose mapping model on the training data applying a statistical model or a neural network to the training data.

In a 57th aspect, a method for estimating an eyelid shape mapping model from an eye pose of an eye in an eye image to a set of parameters is disclosed. The method comprises: using a set D of eye images to determine an eyelid shape mapping model from an eye pose of an eye to a set of parameters of the eye, wherein the set of parameters specify a functional form for an eyelid boundary at an upper eyelid of the eye or a lower eyelid of the eye.

In a 60th aspect, the method of aspect 59, further comprising: using the functional form to extract iris pixels for identity determination or verification.

In a 61st aspect, the method of any one of aspects 59-60, wherein the functional form comprises a pixel mask.

In a 62nd aspect, the method of any one of aspects 59-61, further comprising: using the functional form to initialize an eyelid search algorithm.

In a 63rd aspect, the method of any one of aspects 59-62, further comprising: using the functional form to exclude random guesses as candidates for membership in a final curve of a refined eyelid boundary determination.

In a 64th aspect, the method of aspect 63, wherein using the functional form to exclude random guesses as candidates for membership in a final curve of a refined eyelid boundary determination comprises: using the functional form to exclude candidates in a Random Sample Consensus (RANSAC) algorithm or a random subset-based fitting algorithm.

In a 65th aspect, the method of any one of aspects 59-64, wherein the eyelid shape mapping model comprises a parabolic curve having three parameters.

In a 66th aspect, the method of any one of aspects 59-65, wherein the eyelid shape mapping model comprises three quadratic polynomials, wherein inputs of the three quadratic polynomials comprises two angular parameters of the eye pose.

In a 67th aspect, the method of the aspect 66, wherein the two angular parameters are expressed as five parameters.

In a 68th aspect, the method of any one of aspects 59-67, wherein the eyelid shape mapping model is learned by a neural network comprising one or more hidden layers.

In a 69th aspect, the method of aspect 68, wherein the one or more hidden layers comprise an output logistic layer.

In a 70th aspect, the method of any one of aspects 59-69, wherein the set D of eye images comprise eye images of a left eye and a right eye.

In a 71st aspect, the method of aspect 70, wherein the eye is a right eye, and wherein the eyelid shape mapping model is determined using a horizontal mirror image of the eye image.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for eyelid shape estimation, comprising:
under control of a hardware processor:
detecting a pupillary boundary of an eye using an edge detector;
determining an eye pose of the eye using the pupillary boundary,
 wherein an eye pose coordinate system of the eye pose comprises an azimuthal angle and a zenithal angle of the eye relative to a resting orientation of the eye,
 wherein a functional relationship between the eye pose coordinate system and an eyelid shape coordinate system comprises a mapping matrix, and
 wherein the eyelid shape coordinate system comprises a horizontal shift, a vertical shift, and a curvature of the eyelid;

estimating an eyelid shape of the eye based at least in part on the eye pose and the functional relationship, wherein the functional relationship relates the eye pose to the eyelid shape; and fitting a parabolic curve of an eyelid shape of the eye based on the eyelid shape.

2. The method of claim 1, wherein fitting the parabolic curve comprises:

fitting a new parabolic curve of the eyelid shape of the eye based on the eyelid shape if the curvature of the parabolic curve is positive and the eyelid is an upper eyelid of the eye or if the curvature of the parabolic curve is negative and the eyelid is a lower eyelid.

3. The method of claim 1, further comprising:

applying a morphological filter to the eye image prior to detecting the pupillary boundary of the eye using the edge detector.

4. The method of claim 1, wherein the edge detector comprises a Canny edge detector.

5. The method of claim 1, wherein the mapping matrix is determined by a regression analysis of eyelid shapes and eye poses.

6. A head mounted display system comprising:

an image capture device configured to capture an eye image;

non-transitory memory configured to store an eyelid shape mapping model; and a hardware processor in communication with the non-transitory memory, the hardware processor programmed to:

determine a pupillary boundary of an eye;

determine an eye pose of an eye in the eye image using the determined pupillary boundary, wherein an eye pose coordinate system of the eye pose comprises an azimuthal angle and a zenithal angle of the eye relative to a resting orientation of the eye, wherein a functional relationship between the eye pose coordinate system and an eyelid shape coordinate system comprises the eyelid shape mapping model, and wherein the eyelid shape coordinate system comprises a horizontal shift, a vertical shift, and a curvature of the eyelid; and estimate an eyelid shape of the eye based at least in part on the eye pose and the eyelid shape mapping model, wherein the eyelid shape mapping model relates the eyelid shape to the eye pose.

7. The head mounted display system of claim 6, wherein the eyelid shape mapping model comprises a parametric relationship between the eye pose and the eyelid shape.

8. The head mounted display system of claim 7, wherein the parametric relationship comprises a parabola.

9. The head mounted display system of claim 7, wherein the parametric relationship comprises a polynomial.

10. The head mounted display system of claim 6, wherein the eyelid shape mapping model comprises a neural network.

11. The head mounted display system of claim 6, wherein the hardware processor is further programmed to:

determine biometric data of the eye using the eyelid shape.

12. The head mounted display system of claim 11, wherein the biometric data comprises an iris code of the eye.

13. The head mounted display system of claim 6, wherein the hardware processor is further programmed to:

re-determine the eye pose based on the eyelid shape; and verify consistency of the determined eye pose and the re-determined eye pose.

* * * * *